United States Patent Office 3,168,527
Patented Feb. 2, 1965

3,168,527
1-ARYL-5-(p-FLUOROPHENYL)-PYRROLE-2-PROPIONIC ACID COMPOUNDS
Franklin W. Short, Ann Arbor, Mich., assignor to Parke, Davis & Company, Detroit, Mich., a corporation of Michigan
No Drawing. Filed June 14, 1962, Ser. No. 202,390
7 Claims. (Cl. 260—326.3)

This invention relates to fluorophenyl compounds having a pyrrole nucleus. More particularly, it relates to 1-aryl-5-(p-fluorophenyl)-pyrrole-2-propionic acid compounds of the formula

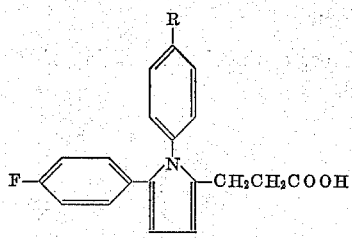

to salts and lower alkyl esters of said compounds and to methods for their production; where R represents lower alkyl, lower alkoxy or fluorine.

In accordance with the invention, 1-aryl-5-(p-fluorophenyl)-pyrrole-2-propionic acids of the foregoing formula and salts and lower alkyl esters of said compounds can be produced by reacting 6-(p-fluorobenzoyl)-4-oxohexanoic acid of the formula

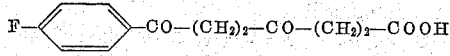

or salts or lower alkyl esters thereof with compounds of the formula

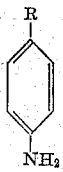

where R is as defined before. The reaction can be carried out in an unreactive solvent such as toluene, benzene, acetic acid, ethanol, aqueous ethanol, dioxane, dimethyl acetamide, tetrahydrofuran or mixtures thereof. A preferred solvent is toluene. In those cases where one of the reactants is a liquid at the reaction temperature the process can also be carried out without an added solvent. A catalyst such as p-toluenesulfonic acid, benzenesulfonic acid, ethanesulfonic acid, hydrochloric acid, sulfuric acid or other strong acid can be added to the reaction mixture. The process is normally carried out using approximately equimolar quantities of reactants, or a moderate excess of either can be used. The temperature at which the reaction is carried out is not critical. A range of approximately 50° to 200° C. is satisfactory, a preferred temperature being from 80° C. to 120° C. Depending on the particular reactants and the temperature, the time required for completion of the reaction varies from a few minutes to a few days. With toluene at the reflux temperature, the reaction is usually substantially complete in less than 4 hours.

The product can be isolated in the form of a carboxylic acid or a salt or lower alkyl ester thereof. The carboxylic acids can be converted to salts by reaction with a variety of organic or inorganic bases. Non-toxic salts are formed by reaction with bases such as sodium hydroxide, potassium hydroxide, calcium hydroxide, sodium carbonate, ammonia, 2-hydroxyethylamine and choline. The salts can be converted to the free carboxylic acids by treatment of an aqueous solution of the salt with a mineral acid. The carboxylic acids can be converted to their lower alkyl esters by esterification, such as by heating the carboxylic acid in a lower alkanol containing a small amount of a strong acid. The lower alkyl esters can be converted to the free carboxylic acids by hydrolysis, as by heating a solution of a lower alkyl ester in aqueous methanol with sodium hydroxide or potassium hydroxide and then acidifying the mixture.

The 6-(p-fluorobenzoyl)-4-oxohexanoic acid employed as a starting material in the process of the invention can be prepared by general procedures already described in the literature. As an example, p-fluoroacetophenone is condensed with 2-furaldehyde of the formula

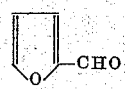

to yield 4'-fluoro-3-(2-furyl)acrylophenone of the formula

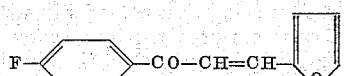

which is then reacted with concentrated hydrochloric acid in ethanol followed by dilute aqueous acid to yield the 6-(p-fluorobenzoyl)-4-oxohexanoic acid required as starting material. The procedures are described in Berichte, 34, 1263 (1901), Journal of the Chemical Society, 1743 (1939), and various other publications. The 6-(p-fluorobenzoyl)-4-oxohexanoic acid can be converted to its salts and lower alkyl esters by mild treatment with a base or with an esterifying reagent, preferably a mild reagent such as diazomethane.

The products of the invention are useful as pharmacological agents and as chemical intermediates. They are anti-inflammatory agents and are of value in reducing inflammation and alleviating the symptoms of rheumatic, arthritic and other inflammatory conditions. They are active upon either oral or parenteral administration and oral administration is preferred. They can be employed in either free acid, salt or lower alkyl ester form depending on the solubility properties desired.

The invention is illustrated by the following examples.

*Example 1*

A solution of 10.0 g. of 6-(p-fluorobenzoyl)-4-oxohexanoic acid and 5.0 ml. of p-ethylaniline in 50 ml. of toluene is heated under reflux for one hour with continuous removal of the water formed in the condensate. The reaction mixture is cooled and the insoluble 1-(p-ethylphenyl)-5-(p-fluorophenyl)-pyrrole-2-propionic acid which separates is collected on a filter and washed with benzene and with petroleum ether, M.P. 158–159° C., following crystallization from ethanol.

By the reaction of 10.2 g. of 6-(p-fluorobenzoyl)-4-oxohexanoic acid with 4.4 g. of p-toluidine, the product obtained is 1-(p-tolyl)-5-(p-fluorophenyl)-pyrrole-2-propionic acid, M.P. 158–161° C., following crystallizations from ethanol, ethyl acetate and aqueous ethanol.

The starting material can be obtained as follows. Equimolar quantities of p-fluoroacetophenone and 2-furaldehyde are gradually added with stirring and external cooling to a 1% solution of sodium methoxide in methanol to give 4'-fluoro-3-(2-furyl)-acrylophenone, M.P. 70° C. This compound is then boiled with about 5 times its weight of a solution of 4 parts by volume of ethanol to 1 part by volume of hydrochloric acid for about 5 hours, or until the ethanol has distilled off, and the residue is boiled with 10–12% aqueous hydrochloric acid. Alternatively, the compound is boiled with about 5 times its weight of a solution of 2 parts by volume of ethanol to 1 part by volume of hydrochloric acid for about 16 hours, the ethanol is distilled off and the residue is boiled with a mixture of 4 parts of water, 1 part of hydrochloric acid and 1 part of acetic acid. The product is 6-(p-fluorobenzoyl)-4-oxohexanoic acid, M.P. 123–124° C.

*Example 2*

A solution of 10.2 g. of 6-(p-fluorobenzoyl)-4-oxohexanoic acid and 5.0 g. of p-methoxyaniline in 50 ml. of toluene is heated under reflux for 3 hours with continuous removal of the water formed in the condensate. The reaction mixture is cooled and the insoluble 1-(p-methoxyphenyl)-5-(p - fluorophenyl)-pyrrole-2-propionic acid which separates is collected on a filter and washed with benzene and petroleum ether, M.P. 142–144° C., following crystallizations from aqueous ethanol, ethyl acetate and aqueous ethanol.

A suspension of 5 g. of 1-(p-methoxyphenyl)-5-(p-fluorophenyl)-pyrrole-2-propionic acid in 250 ml. of warm water is titrated with 147 ml. of 0.1 normal sodium hydroxide solution and the resulting solution is filtered. The filtrate is evaporated to dryness to give 1-(p-methoxyphenyl)-5-(p - fluorophenyl)-pyrrole-2-propionic acid sodium salt. The potassium ammonium and ethanolamine salts are prepared by reaction of the free acid with, respectively, potassium hydroxide solution, aqueous ammonia and 2-hydroxyethylamine solution.

A mixture of 2 g. of 1-(p-methoxyphenyl)-5-(p-fluorophenyl)-pyrrole-2-propionic acid, 40 ml. of methanol and 0.2 g. of p-toluenesulfonic acid is heated under reflux for 4 hours and then concentrated to a small volume and chilled. The insoluble product, 1-(p-methoxyphenyl)-5-(p-fluorophenyl)-pyrrole-2-propionic acid methyl ester, is collected and dried. The corresponding ethyl ester is obtained by the substitution of 40 ml. of ethanol for the methanol.

A mixture of 1 g. of 1-(p-methoxyphenyl)-5-(p-fluorophenyl)-pyrrole-2-propionic acid methyl ester, 0.5 g. of potassium hydroxide and 25 ml. of 50% aqueous methanol is heated under reflux for 2 hours and diluted with 75 ml. of water. The resulting solution of 1-(p-methoxyphenyl)-5-(p-fluorophenyl) - pyrrole-2-propionic acid potassium salt is acidified with dilute hydrochloric acid and the insoluble 1-(p-methoxyphenyl)-5-(p-fluorophenyl)-pyrrole-2-propionic acid is collected, M.P. 142–144° C., following crystallizations from aqueous ethanol, ethyl acetate and aqueous ethanol.

*Example 3*

A solution of 7.5 g. of 6-(p-fluorobenzoyl)-4-oxohexanoic acid and 3.9 ml. of p-ethoxyaniline in 35 ml. of toluene is heated under reflux for 2 hours with continuous removal of the water formed in the condensate. The reaction mixture is cooled and the insoluble 1-(p-ethoxyphenyl)-5-(p-fluorophenyl) - pyrrole - 2 - propionic acid which separates is collected on a filter and washed with benzene and with petroleum ether, M.P. 195–196° C., following crystallizations from ethyl acetate-petroleum ether and aqueous ethanol.

*Example 4*

A solution of 7.5 g. of 6-(p-fluorobenzoyl)-4-oxohexanoic acid and 2.8 ml. of p-fluoroaniline in 35 ml. of toluene is heated under reflux for 3 hours with continuous removal of the water formed in the condensate. The reaction mixture is cooled and the insoluble 1,5-bis-(p-fluorophenyl)-pyrrole-2-propionic acid which separates is collected on a filter and washed with benzene and with petroleum ether, M.P. 167–169° C., following crystallization from aqueous ethanol.

I claim:
1. A member of the class consisting of compounds of the formula

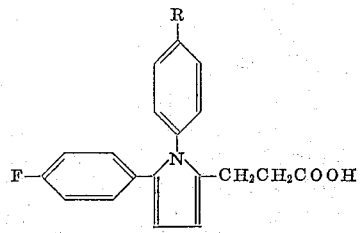

non-toxic salts of said compounds and lower alkyl esters of said compounds; where R is a member of the class consisting of lower alkyl, lower alkoxy and fluorine.

2. 1-(p-lower alkylphenyl) - 5 - (p-fluorophenyl)-pyrrole-2-propionic acid.

3. 1-(p-ethylphenyl) - 5 - (p-fluorophenyl)-pyrrole-2-propionic acid.

4. 1-(p-lower alkoxyphenyl)-5-(p - fluorophenyl)-pyrrole-2-propionic acid.

5. 1-(p-methoxyphenyl) - 5 - (p-fluorophenyl)-pyrrole-2-propionic acid.

6. 1-(p-ethoxyphenyl - 5 - (p-fluorophenyl)-pyrrole-2-propionic acid.

7. 1,5-bis-(p-fluorophenyl)-pyrrole-2-propionic acid.

References Cited in the file of this patent

Blicke et al.: "J. Am. Chem. Society," pages 1675–77, vol. 66 (1944).

Holdsworth et al.: "Chemical Abstracts," page 6653[3], vol. 31 (1937).